US008762509B2

(12) United States Patent
Gall et al.

(10) Patent No.: US 8,762,509 B2
(45) Date of Patent: Jun. 24, 2014

(54) DIGITAL DATA PROCESSING METHODS AND SYSTEMS FOR CULTIVATING AND PROVIDING GUEST FEEDBACK ON RENTAL ACCOMMODATIONS

(75) Inventors: Jeremiah Gall, Cambridge, MA (US); Thomas Mahony, Boston, MA (US); Carl Query, Milton, MA (US)

(73) Assignee: FlipKey, Inc., Boston, MA (US)

( * ) Notice: Subject to any disclaimer, the term of this patent is extended or adjusted under 35 U.S.C. 154(b) by 855 days.

(21) Appl. No.: 12/973,540

(22) Filed: Dec. 20, 2010

(65) Prior Publication Data
US 2011/0145158 A1 Jun. 16, 2011

Related U.S. Application Data

(62) Division of application No. 12/350,390, filed on Jan. 8, 2009, now Pat. No. 7,899,875.

(60) Provisional application No. 61/010,356, filed on Jan. 8, 2008.

(51) Int. Cl.
*G06F 15/16* (2006.01)
*G06F 12/00* (2006.01)

(52) U.S. Cl.
USPC .......................................................... 709/223

(58) Field of Classification Search
CPC ... G06Q 30/02; G06Q 30/0645; G06Q 10/06; G06Q 50/16; G06Q 50/30; G06Q 10/02; G06Q 30/018; G06Q 40/06; G06Q 10/00; G06Q 30/0611; G06Q 40/08; B41L 3/04; B42D 12/00
USPC .................. 709/203, 206–207, 223–229, 250
See application file for complete search history.

(56) References Cited

U.S. PATENT DOCUMENTS

| 7,313,700 | B2 | 12/2007 | Delany |
| 7,603,420 | B2 | 10/2009 | Doan et al. |
| 7,899,875 | B1 | 3/2011 | Gall et al. |
| 2002/0065748 | A1 | 5/2002 | Taniguchi et al. |
| 2004/0079798 | A1* | 4/2004 | Messenger et al. ........... 235/381 |
| 2005/0071376 | A1* | 3/2005 | Modi ......................... 707/104.1 |
| 2005/0080702 | A1* | 4/2005 | Modi .............................. 705/36 |
| 2005/0223062 | A1 | 10/2005 | Doan et al. |
| 2009/0083093 | A1* | 3/2009 | Colletti ............................ 705/7 |

* cited by examiner

*Primary Examiner* — Zarni Maung
(74) *Attorney, Agent, or Firm* — Nutter McClennen & Fish LLP; David J. Powsner

(57) ABSTRACT

The invention provides, in some aspects, methods and systems for cultivating and providing guest feedback on rental accommodations that comprise a plurality of modules that execute on a digital data processor, including, a first module that obtains email addresses, a second module that validates those e-mail addresses, a third module that generates and delivers invitations to authorized email addresses, a fourth module that authenticates users that respond to those invitations, a fifth module that validates content entered by users in response to the invitations, a sixth module that stores the validated content, and a seventh module that accepts input from managers in regard to that content. Method and systems according to the invention cultivate user feedback and reviews to substantiate accurate vacation home rental and alternative lodging (refers to small lodging services, such as bed and breakfasts, cabins, etc.) accommodations through a closed cultivation system.

21 Claims, 11 Drawing Sheets

DIGITAL DATA PROCESSING METHODS AND SYSTEMS FOR CULTIVATING AND PROVIDING GUEST FEEDBACK ON RENTAL ACCOMMODATIONS

This application is a divisional of U.S. application Ser. No. 12/350,390 on Jan. 8, 2009, entitled "DIGITAL DATA PROCESSING METHODS AND SYSTEMS FOR CULTIVATING AND PROVIDING GUEST FEEDBACK ON RENTAL ACCOMMODATIONS," which claims the benefit of filing of U.S. Provisional Patent Application Ser. No. 61/010,356, filed Jan. 8, 2008, entitled "METHODS FOR CULTIVATING AND PROVIDING GUEST FEEDBACK ON RENTAL ACCOMMODATIONS AND SYSTEMS THEREOF," the teachings of both which are incorporated herein by reference.

BACKGROUND OF THE INVENTION

This invention generally relates to digital data processing and, more particularly, by way of non-limiting example, to digital data processing methods and systems for cultivating and providing guest feedback on rental accommodations.

As more transactions are conducted online, with little or no prior personal interaction with the service provider, there is an increased importance on guest reviews and customer feedback to determine if a service provider is reputable. These reviews and this reputation information is only useful if prospective guests and readers trust the accuracy of such reviews. In industries or markets where service providers conduct many transactions (i.e. a restaurant or hotel) online users may discount any self-serving or fraudulent reviews because they will be outweighed by the sheer volume of other reviews collected by the service provider. However, in other markets, such as vacation rental homes and alternative lodging accommodations, where: (i) each unit is unique; (ii) each unit has a limited number of potential reviewers per year; and (iii) guest feedback is important to the transaction decision, there is an increased emphasis on trusted reviews. Such industries have unique concerns and challenges and require a third-party service to cultivate guest reviews and to verify their authenticity.

In the vacation home rental industry, accommodation managers and listing services may include a limited number of guest reviews on their internet website. Guests rarely navigate back to the accommodation manager site or listing service to leave a review after their vacation rental stay. In addition, third party review sites do not provide an adequate user experience to effectively cultivate verified reviews in highly fragmented markets, such as vacation home rentals and alternative lodging accommodations. Hotels maintain a brand presence that allows guests to self navigate to the appropriate open review submission page of a lodging provider. In the case of vacation rentals, self navigation is extremely difficult. For example, in the Orlando, Fla. market there are over 10,000 unique vacation home rentals represented by thousands of independent owners and small accommodation managers. Allowing a guest to self navigate and leave a review often results in either (i) the guest becoming frustrated and exiting the website or (ii) accidentally leaving a review for the wrong home.

Open (i.e. any user can enter the website and submit a review for a service provider) online review systems, also depend on high review volume to manage fraudulent reviews. Due to the open nature of the system (i.e. allowing any user to leave a review of a lodging accommodation) the system is susceptible to self promotion and malicious competitive reviews. In high transaction-volume services, such as hotels, fraudulent reviews can be managed and discounted based on the sheer volume of user reviews. Low transaction-volume lodging services, such as vacation home rentals, are more vulnerable and require an alternative system to both cultivate and verify the authenticity of reviews.

In view of the foregoing, an object of the invention is to provide improved methods and systems for digital data processing.

Still another object of the invention is to provide such methods and systems as are adapted to support cultivating and providing customer/client feedback for good/services in (a) highly fragmented markets and/or (b) markets in which those goods/services are (i) unique, (ii) have a limited number of potential reviewers, and/or (iii) for which is an increased emphasis on trusted reviews.

A related object is to provide such methods and system as are adapted for, by way of non-limiting example, cultivating and providing guest feedback for vacation rental homes and alternative lodging accommodations.

Yet another object of the invention is to provide such methods and systems as can be implemented with legacy computing componentry and/or using legacy data.

SUMMARY OF THE INVENTION

The foregoing objects are among those attained by the invention which provides, in some aspects, methods and systems for cultivating and providing guest feedback on rental accommodations that comprise a plurality of modules that execute on a digital data processor, including, a first module that obtains email addresses, a second module that validates those e-mail addresses, a third module that generates and delivers invitations to authorized email addresses, a fourth module that authenticates users that respond to those invitations, a fifth module that validates content entered by users in response to the invitations, a sixth module that stores the validated content, and a seventh module that accepts input from managers in regard to that content.

Related aspects of the invention provide a system as described above in which the first module comprises one or more sub-modules, including a sub-module that allows managers and/or owners of homes to input email addresses that correspond to their property reservations, a sub-module that executes on the digital data processor and that supports integration of software providers, and a sub-module that accepts data feed uploading by manager/owners.

Further related aspects of the invention provide a system as described above in which the second module includes one or more of a first filter that checks email addresses for well-formattedness, a second filter that checks email addresses against an opt-out list, a third filter that checks email addresses against a bounced email address list, and a fourth filter that checks email addresses entered in connection with a prior review of a same property.

Still further related aspects of the invention provide a system as described above in which the fifth module checks for fraud by users authenticated by the fourth module.

In further aspect, the invention provides a service facilitated through a website that displays general marketing, hospitality service and product information for Rental Managers. The site allows such Rental Managers to present descriptions, pictures, location, availability and reviews of past guests of their lodging accommodations. Providers are assigned a user-name and password that allows them to access their 'user account'. Within the user account Rental Managers can modify and update their product and service descriptions for each individual product unit (i.e. each of several vacation rental homes, cabins or unique rooms in a bed and breakfast).

In the next aspect of the invention, through a web-browser page, the Rental Manager may access their user account and access what is referred to as the "Reputation Manager," although other numbers and types of systems with other titles could be accessed. The Reputation Manager allows the provider to upload, either manually or through file transfer, a list of customers that have completed a transaction with the specific unique lodging accommodation they previously transacted with (i.e. the unique rental home in Orlando, Fla. or the specific cabin in New Hampshire that the customer occupied). Again, in the example of vacation home rentals, this would comprise individual customers that had previously completed a rental transaction for a given vacation home that the Rental Manager provided the guest. Through the Reputation Manager interface, the Rental Manager may continue to add guest contact information (e.g. emails, names, etc.) for guests that completed a transaction with each one of their products or services.

In the next aspect of the invention, the third-party service, via the Reputation Manager, distributes a guest feedback request to the individual guests the Rental Manager listed in the Reputation Manager. Distribution is made via email and each guest is assigned a unique identifier, although other manners for distribution can be used. Only from within this email, uniquely sent to a specific guest, can a guest access the review submission process, thus prohibiting open, public reviews and aiding in eliminating fraudulent reviews. When the prior guest has completed their review of the unique product (i.e. unique vacation home rental), the system, again via a web-interface, prompts this user to enter a unique password in order to register with the third-party service. In doing so, the user will be able to create a robust personal profile, which may be used to assist in validating the submitted review.

In the next aspect of the invention, the method and system described herein allows the guest to submit a review of the vacation home rental or alternative lodging accommodation they previously rented or occupied (i.e. the unique rental home in Orlando, Fla. or the specific cabin in New Hampshire that the customer occupied). On submission, the system applies what is referred to as the authentication process. In the example of vacation home rentals and alternative lodging accommodations, due to the infrequency of transactions (i.e. each user is likely to only visit a unique vacation home rental or bed and breakfast once a year) the authentication process can verify that a request has not been made of the same guest for the same vacation rental or alternative lodging service at an earlier time. Similarly, the authentication process described herein and the subject of this invention will exclude reviews submitted by the same IP address of the requesting party, reducing cases of self promotion.

Another aspect of the invention, relates to a second method within the system to collect verified guest feedback. Within the web service, users may search for and select inventory from Rental Managers. By way of example, and without limitation, a user may search for vacation rental accommodations in North Carolina. Continuing this example, the user may then contact the Rental Manager through the third-party web service, requesting a reservation. This third-party service records this interaction with the web browser and stores the information in a database. Following the requested date of the accommodations, the third-party service will generate a guest feedback request on behalf of the Rental Managers and distribute it to the guest via email. Again, this distribution will be sent to a specific guest, which is assigned a unique identifier. Only from within this email, uniquely sent to a specific guest, could a guest access the review submission process. Again, in limiting access to reviews to guests that have (i) actively requested services through the third-party website, as described in this paragraph; or (ii) have been listed as prior guests of a Rental Manager, as described in the preceding two paragraphs and by authenticating the user's email, domain and IP address, this method and system provides a process for managing guest feedback in a marketplace with limited and infrequent transactions.

In variations of this method and system, the authentication process described herein may include or exclude one or more of the authentication filters described. In variations of this method and system, reviews may be normalized, aggregated, weighted and recalculated and displayed publicly to the online network individually or collectively.

The present invention is designed for vacation home rental and alternative lodging accommodation service providers to manage their online reputation and cultivate accurate and trusted guest reviews and feedback via a closed third-party verification service. Utilizing such a method and system provides these users (i.e. the managers of vacation home rentals and alternative lodging accommodations) with a method to collect and establish their reputation, verify that guest reviews are the opinion of prior guests and thereby increase guest confidence in their guest and management services and accommodations, thus increasing network activity and the volume of their guest inquiries and transactions.

The present invention relates to a process and method that enables vacation rental managers (individual owners representing their own homes and accommodation managers representing multiple, sometimes hundreds, of homes) and alternative lodging accommodation managers and owners (all collectively referred to herein as "Rental Managers") to collect, manage and display verified customer reviews of their services through a third-party service. The process includes a separate third-party entity that collects the guest information and provides an independent web service to manage and display guest feedback information online to the general public and potential guests. This third-party entity may also aggregate listings of vacation rentals or alternative lodging accommodations provided by managers or individual owners and display the aforementioned guest feedback information online in association with each individual listing.

The present invention is most applicable to the vacation home rental and alternative lodging accommodation industry, which will be utilized throughout this description as an example, however the methods and systems described herein may be applied to other service providers.

The foregoing and other aspects of the invention are evident in the attached drawings and the text that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
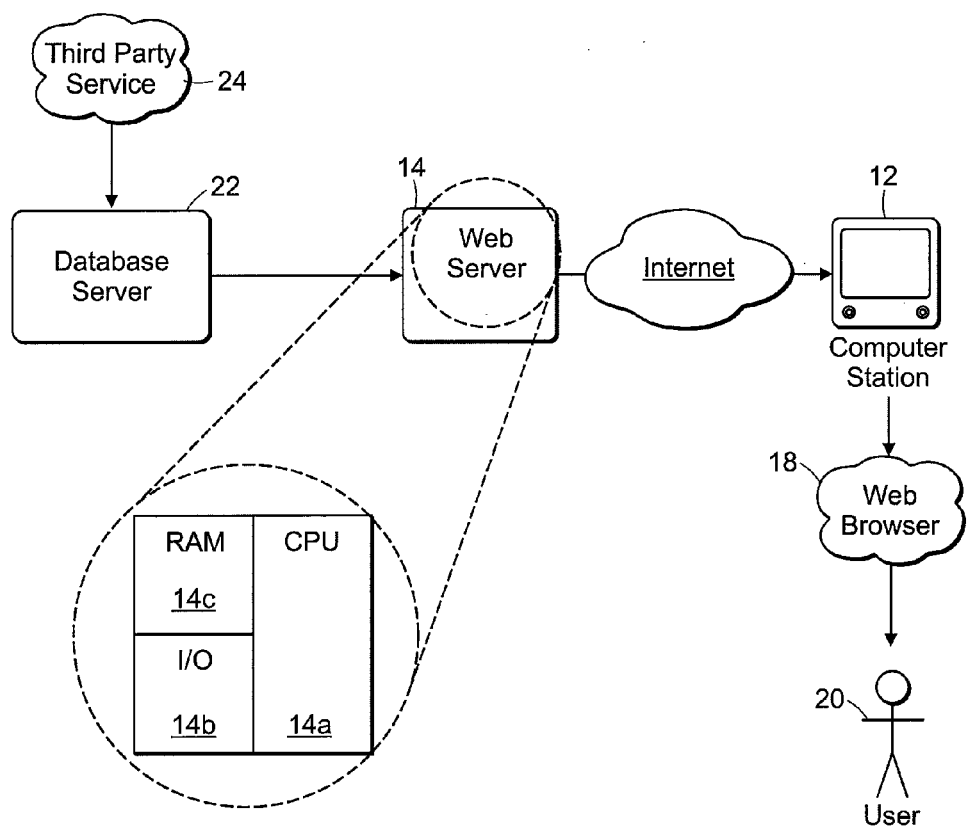
FIG. 1 is a diagram of a system that cultivates and provides feedback on rental accommodations in accordance with embodiments of the present invention.

Referring to FIG. 1, there is shown a diagram of a system 10 that cultivates and provides feedback on rental accommodations in accordance with the present invention. By way of overview, the system 10 includes a plurality of computer stations 12 (only one of which is shown in the drawing), each executing a web browser 18 and each coupled to a web server 14 via one or more networks such as the Internet, as indicated. Web server 14 is, in turn coupled to a database server 22 and a third-party service, again, via an Internet or other network(s). Of course, it will be appreciated that this is just one embodiment of the invention, and that other embodiments may comprise other elements and/or configurations thereof.

The computer station 12 serves as an interface for a user 20 to access the system 10 and, more particularly, serves (in connection with web browser 18) as a typical Web display processing system for receiving and sending Web documents, including search documents and results to the web server 14. Web documents such as the interfaces hereinafter described are displayed on the computer display screen (via browser 18). In the illustrated embodiment, device 12 comprises a personal computer of the type generally available in the marketplace, though, in other embodiments it may comprise personal digital assistant, a laptop computer, a workstation or other digital data processing apparatus suitable for executing a browser 18 (or otherwise providing an interface to the system 10) and/or operating in accord with teachings hereof.

Using Web browser 18 in the computer system 10, Rental Manager information hereinafter described in greater detail are displayed via the Web and through respective Web server 14 and the third-party database server 22. In the illustrated embodiment, the web browser 18 executes on computer station 12 and provides (along with the operating system and other attendant software of device 12) the software component of the aforementioned interface. Browser 18 is a conventional web browser of the type commercially available in the marketplace, e.g., Firefox, Internet Explorer, and so forth, operating in accord with the teachings hereof. In alternate embodiments, browser 18 can be a special-purpose application (e.g., that invokes services of web server 14 via HTTP, remote procedure calls, or otherwise), a firmware-based application, or otherwise. The Web server 14 is in network communication with a devoted website (i.e., the third-party service 24) via the Internet, which devoted website 24 provides a general web site interface for (i) the rental manager 20 to access the Reputation Manager and interfaces hereinafter described; and (ii) the guest 20 either searching online for vacation home rentals or alternative lodging accommodations and providing reviews on the same through the third-party service website 24. The web server 14 is also in network communication with the database server 22.

The illustrated web server 14 comprises a conventional web server of the type known in the art (e.g., Apache executing on a commercially available hardware platform, or otherwise), as adapted in accord with the teachings hereof. To this end, in the illustrated embodiment, software comprising the server (e.g., Apache or otherwise) further includes or invokes modules that facilitate cultivating and providing feedback on rental accommodations and reputation management in accord with the teachings hereof. See FIGS. 9-11 and the accompanying discussion below. In other embodiments, the server 14 may provide services via remote procedure calls, "software as a service", and so forth. Furthermore, in still other embodiments, the functionality of server 14 may be implemented directly on a client device, e.g., computer 12.

The illustrated third-party service 24, which is described further below, executes on a conventional web server (not shown) of the type described above in connection with web server 14 (indeed, in some embodiments, the service 24 can operate on the same server 14).

The database server 22 is in network communication with the database (see, by way of example, FIGS. 2, 5, 6, and 8 and the corresponding text below) and hosts interactions between the database engine and the database. That database can include, for example, database 31, shown in FIGS. 9-10 and discussed below. The system 10 allows for each Rental Manager to supply information in the form of accommodation listings for each particular rental accommodation or unit managed. The illustrated database server 22 comprises a conventional database server of the type known in the art (e.g., MySQL executing on a commercially available hardware platform or otherwise), as adapted in accord with the teachings hereof. In alternate embodiments, database server 22 may act as a "distributed" server, retrieving records directly from the third-party service 24 and/or other databases in response to queries. Alternatively, data may be obtained via integration with a third-party provider (such as a Software Provider described below) over a remote database. The remote database integration can be implemented through a secure and authorized protocol over a mechanism such as XML/SOAP or other similar data format.

Figure 2:
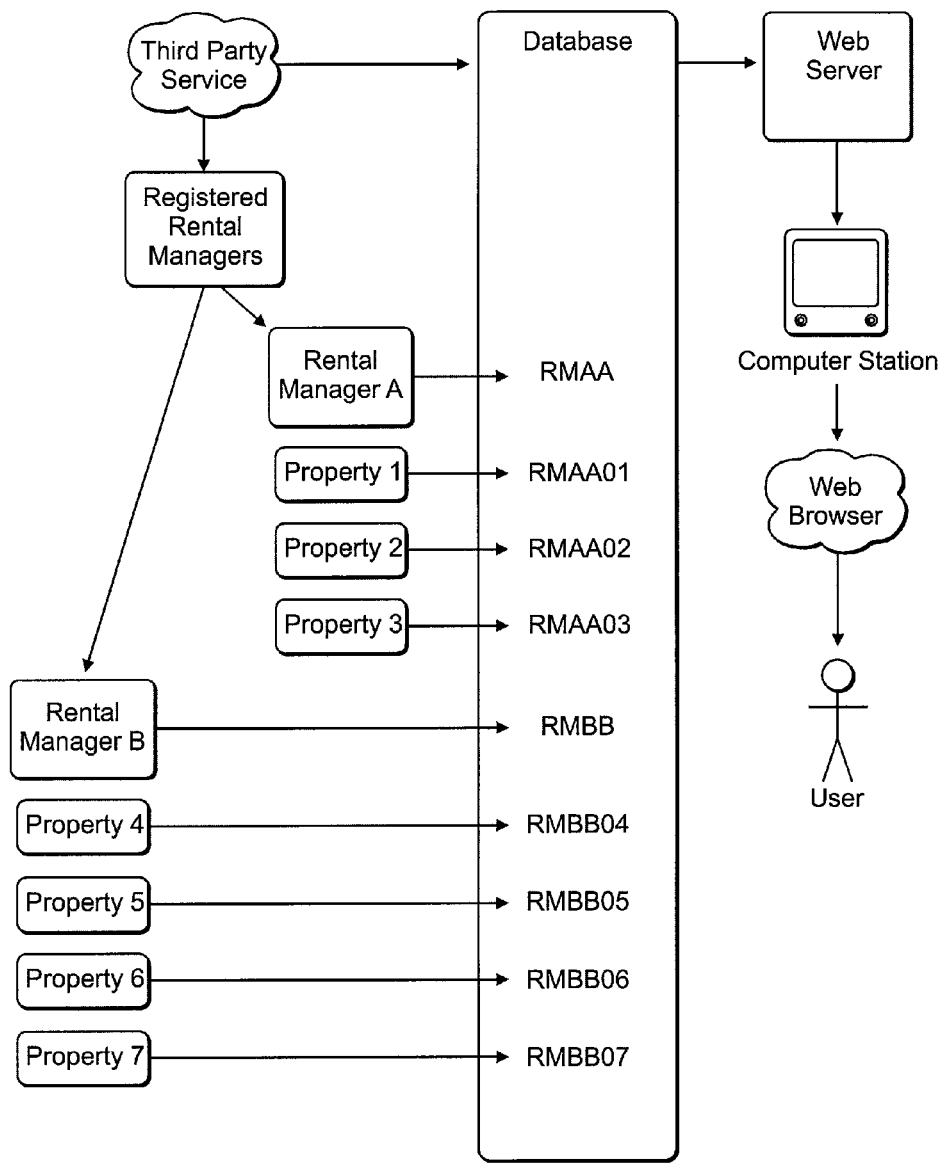
FIG. 2 is a system diagram displaying a web service of registered Rental Managers providing a searchable database of individual vacation homes and/or alternative lodging accommodations.

Referring to FIG. 2, a third-party verification and reputation service is illustrated. Within this figure, a number of Rental Managers are registered with the third-party service. RENTAL MANAGER A has three accommodations registered with the service, ACCOMMODATION 1, 2 and 3. RENTAL MANAGER B has four accommodations registered with the service, ACCOMMODATION 4, 5, 6 and 7.

Each Rental Manager is listed in the database with a unique identifier. As shown in FIG. 2, RENTAL MANAGER A is associated the unique identifier "RMAA" in the database. Additionally, each accommodation is associated a unique identifier in the database, in this example, ACCOMMODATION 1 has been given the identifier "RMAA01." As demonstrated, accommodations associated with each Rental Manager are grouped together. The details of each rental home or alternative lodging accommodation are associated with each accommodation listing in the database. FIG. 2 demonstrates how this information from the database is displayed to individual online users through a web-browser and the third-party service website. Reviews are written and submitted by a user through a Web form. Reviews are passed through the review filter, and then stored in the database with an accepted or suspended status. Accepted reviews are displayed back to guests visiting the Web site.

Figure 3:
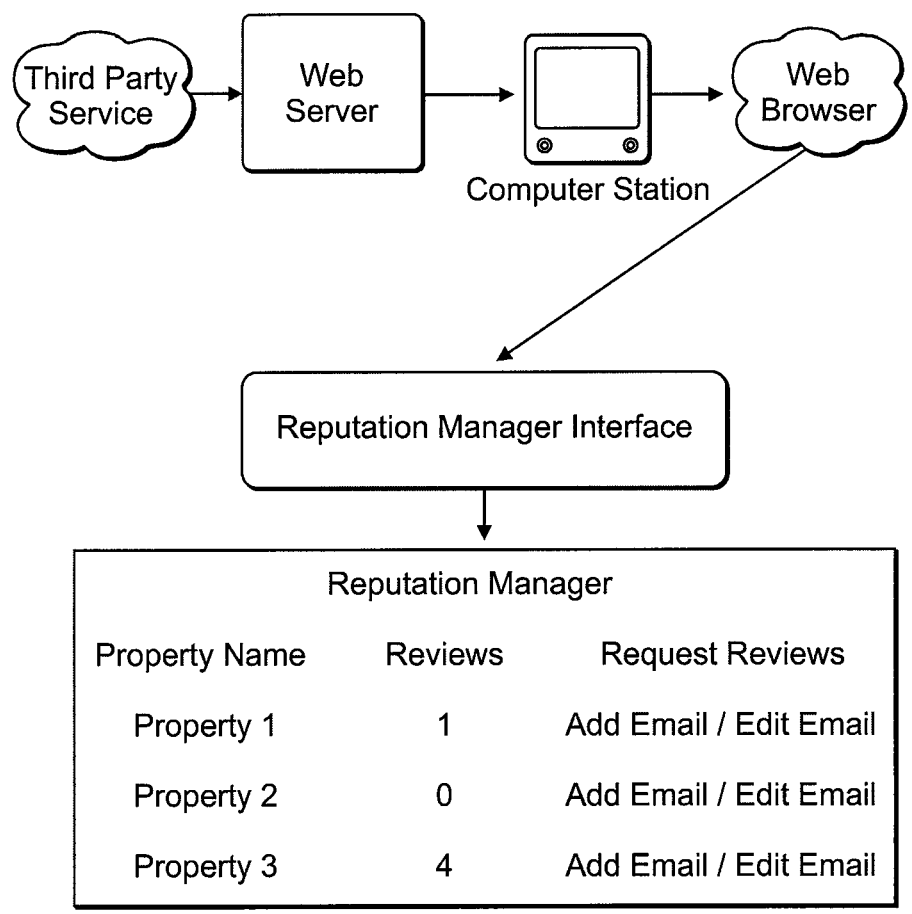
FIG. 3 is a system diagram displaying the Reputation Manager interface

Referring to FIG. 3, a reputation manager interface is illustrated. In this example, the Rental Manager has signed in to the third-party service and accessed the guest feedback cultivation interface, referred to herein as the "Reputation Manager" but may be identified by another title. The Reputation Manager lists each of the unique accommodations managed by the specific Rental Manager. These accommodations may be individual vacation homes, cabins, rooms in a bed and breakfast or other similarly situated unique lodging inventory. As demonstrated in FIG. 3, the accommodations are shown with references to the name of each individual unique accommodation and the number of reviews from prior guests that the Rental Manager has currently cultivated. FIG. 3 shows the interface for Rental Managers to add and edit the email addresses for prior guests and guests of a particular unique lodging unit (i.e. a specific home, cabin, room).

Figure 4:
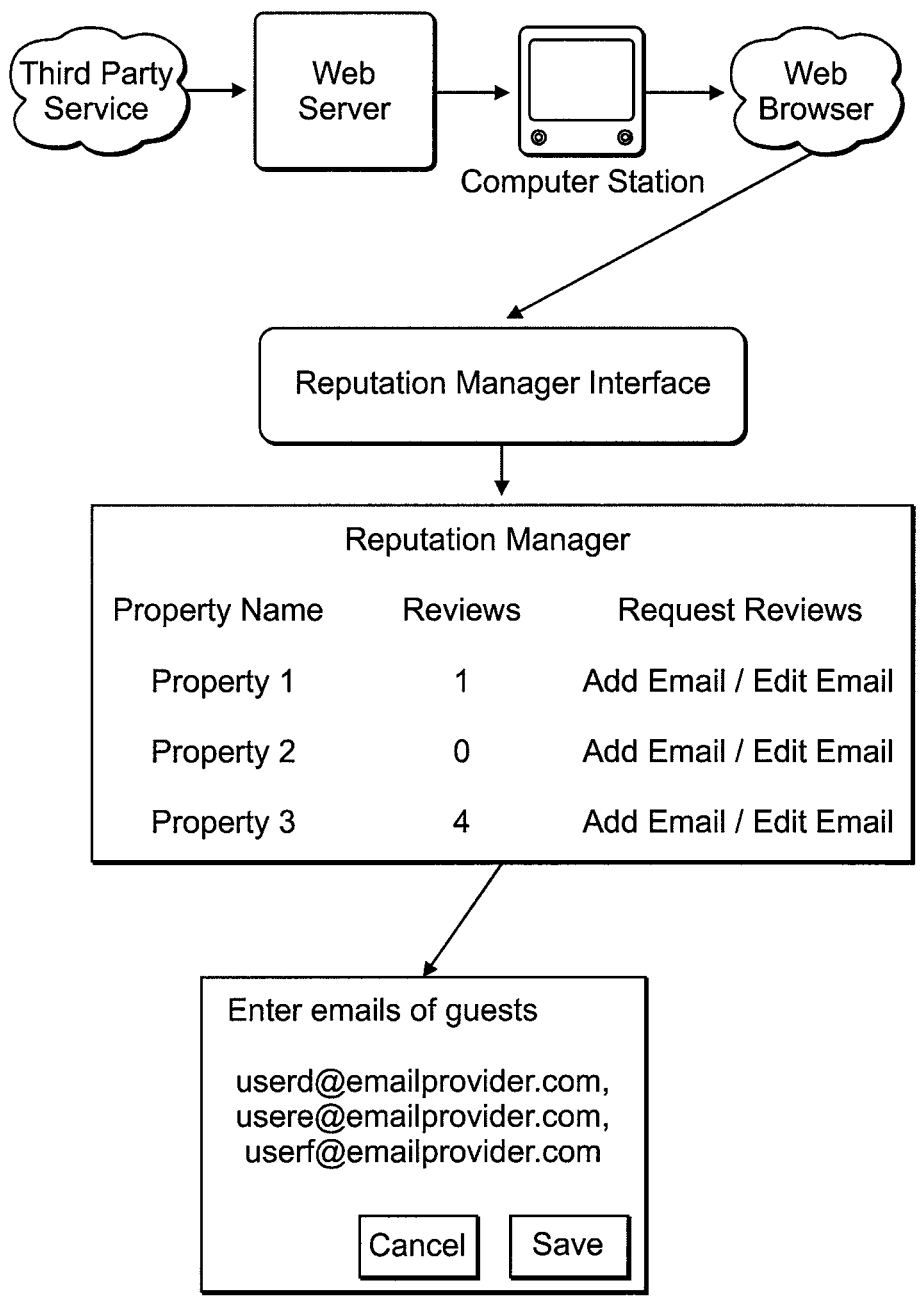
FIG. 4 is a further example of the Reputation Manager interface, displaying the interface for entering the emails of prior guests of the specific Rental Manager.

Referring to FIG. 4, the reputation manager interface with guest information input is illustrated. FIG. 4 continues the example of FIG. 3 and shows the interface for Rental Managers to add and edit the email addresses for prior guests and guests of a particular unique lodging unit. Further, FIG. 4 displays the window for entering the email addresses that correspond to each prior guest of a unique accommodation. After an email address is added via this window, the email is added to the database and associated with the unique accommodation and Rental Manager. FIG. 4 displays how the email address is stored in the database. In this example, RENTAL MANAGER A has added the email address for USER D to the Reputation Manager interface as a prior guest of ACCOMMODATION 1, represented in this example as userd@emailprovider.com. USER D's email address is added to the database, clearly associated with ACCOMMODATION 1 and RENTAL MANAGER A. As it can be appreciated, this is one graphical representation of how this process may be accomplished and email or contact information for prior guests may be entered into the system via alternative formats.

Figure 5:
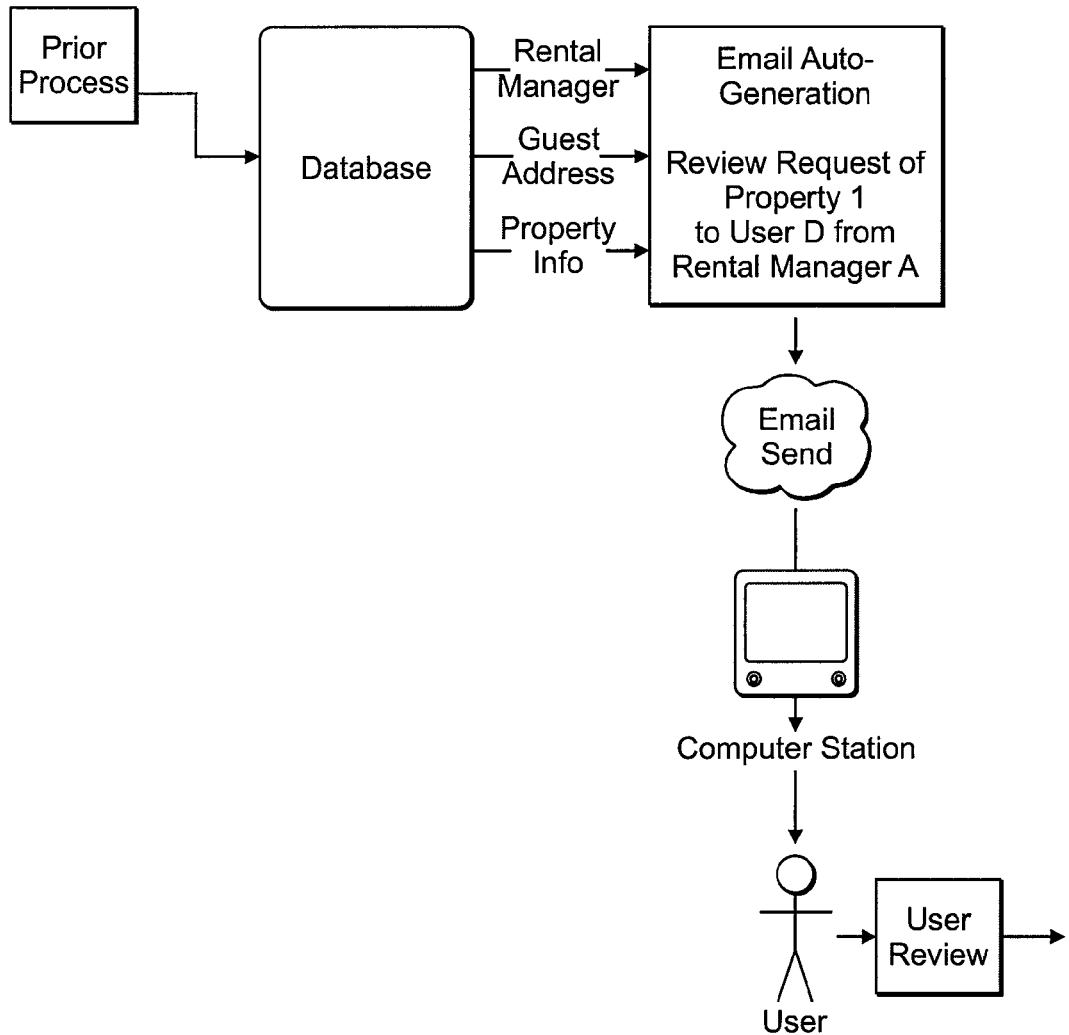
FIG. 5 is a diagram demonstrating the distribution of an email feedback request to prior guests of the specific Rental Manager.

Referring to FIG. 5, the reputation manager interface is illustrated generating unique feedback request for guests. The method and system associates the correct unique identifier for the Rental Manager and the individual accommodation with the prior guest's email address. Continuing on with the example from FIG. 4, USER D's email address is associated with ACCOMMODATION 1 and RENTAL MANAGER A. Using the detailed information and description of ACCOMMODATION 1 in the database system, the Reputation Manager generates a tailored feedback request, which includes a description of ACCOMMODATION 1 and the name of RENTAL MANAGER A and distributes this to USER D's email address. An example of the email process is also shown in FIG. 5.

Figure 6:
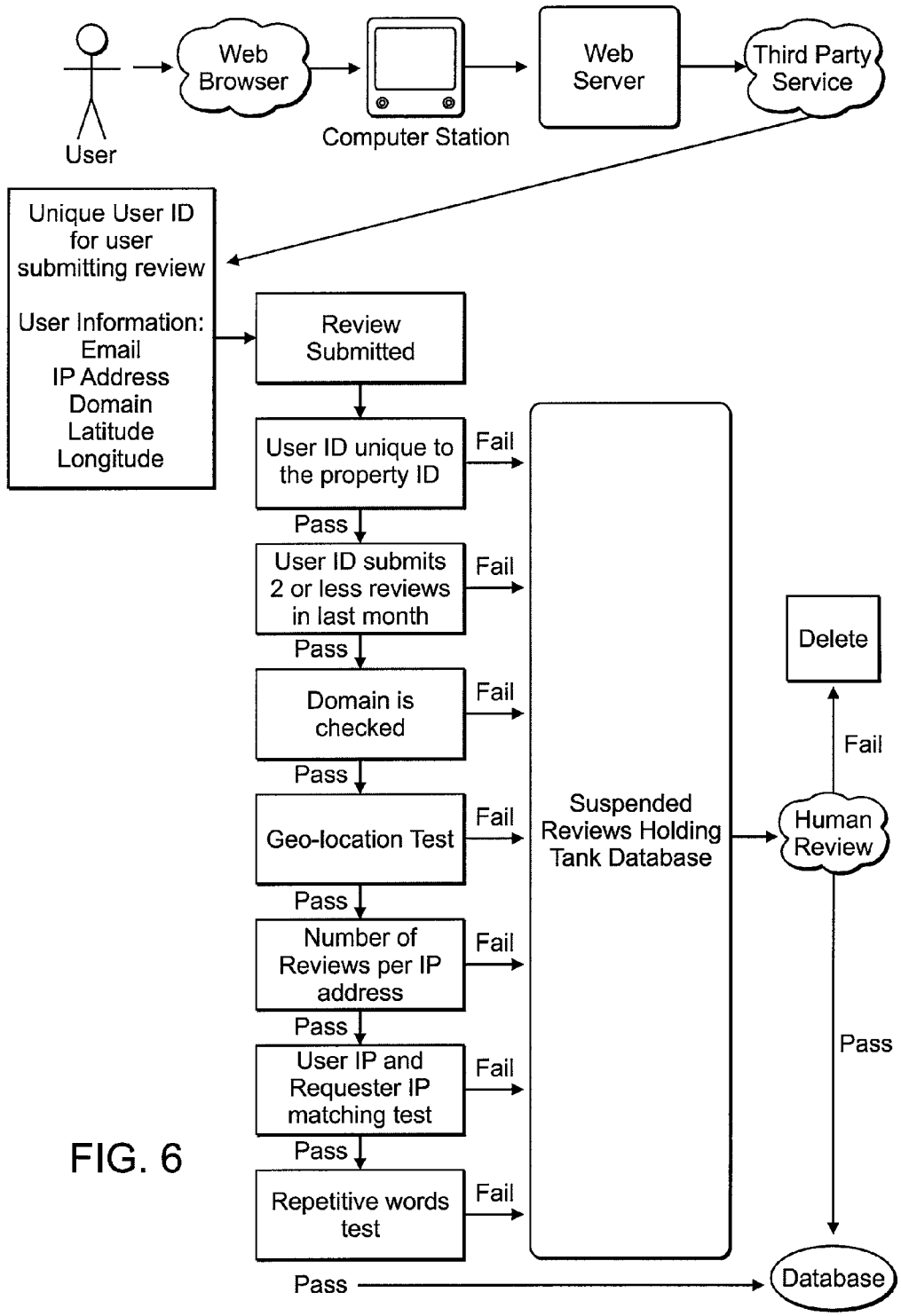
FIG. 6 is a graphical description of the process used to authenticate prior guests and the guest feedback submitted to the network third-party web service.

Referring to FIG. 6, a graphical representation of the authentication method and process associated with verifying a guest review is illustrated. If an e-mail address is a unique user ID, the first verification step authenticates the review by confirming that each unique user identification is allowed only one review per accommodation. The second verification step authenticates the review by confirming that each unique user identification is allowed two reviews total per month. The third verification step confirms that the unique user providing the review has an email domain that is not the same as the email domain of the Rental Manager or accommodation management service. The fourth step of the review submission authentication process concerns the geo-location of the Rental Manager and the unique user providing the review. The Rental Manager office location is geo-located (latitude and longitude) by reference to the office location included in the third party service database. Reviews are not allowed from uses with an IP address within an X mile radius of the Rental Manager office location, where X may be set to any number. The fifth verification step limits the number of reviews from a given IP address, in the example provided the limit is two, but may be set at an alternative threshold. Further reviews from that IP address are put under suspension. The sixth filter and step in the verification process concerns an IP address check on the Rental Manager requesting reviews and the user submitting reviews, such that a review may not be submitted from the same IP address as the requestor (i.e. the Rental Manager requesting the review). Finally, the seventh step in the verification process authenticates the review by checking the repetition of words and characters in the review submitted, such that a review with X % repetitive words is suspended, where X may be set to any number. Aspects of this authentication method and process in FIG. 6 may be included or excluded depending on the level of verification the service wishes to maintain.

Figure 7:
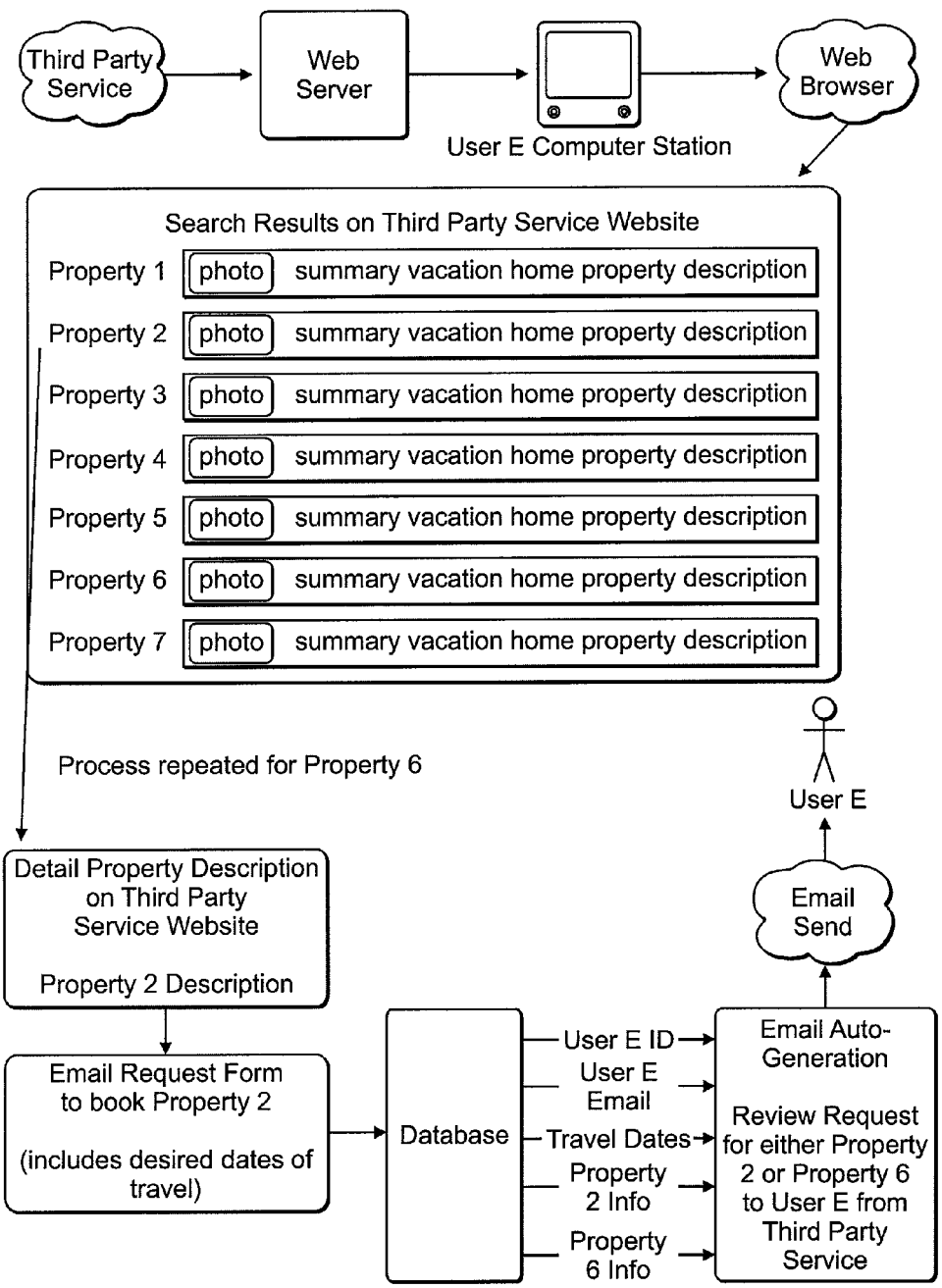
FIG. 7 is a graphical description of the process used to generate guest feedback requests from within the third-party web service, based on guest interaction within the service.

Referring to FIG. 7, an example of what occurs when a feedback request is cultivated based on user interaction within the third-party service is illustrated. Through a web browser a user may access the website of the third-party verification service, in this example USER E. As described earlier and continuing the example provided in FIG. 1, the website displays accommodation listings for each of RENTAL MANAGER A and RENTAL MANAGER B. As such, this website displays the accommodation listings associated with each Rental Manager, in this example ACCOMMODATION 1 through ACCOMMODATION 7. USER E conducts a search for a vacation rental home through the web browser and returns results for ACCOMMODATION 1 through ACCOMMODATION 7. USER E chooses to email the manager of ACCOMMODATION 2 and ACCOMMODATION. In doing so, USER E submits his desired vacation dates in the email request form, as displayed in FIG. 6. The unique identifiers of ACCOMMODATION 2 and ACCOMMODATION 6 are then associated with USER E and stored in the database as such. Following the expected date of travel, the system described herein, automatically generates a feedback request form and distributes the same to USER E via email. USER E is presented with the two accommodations that she/he inquired about and prompted to provide guest feedback if he ultimately stayed in one of these accommodations.

Figure 8:
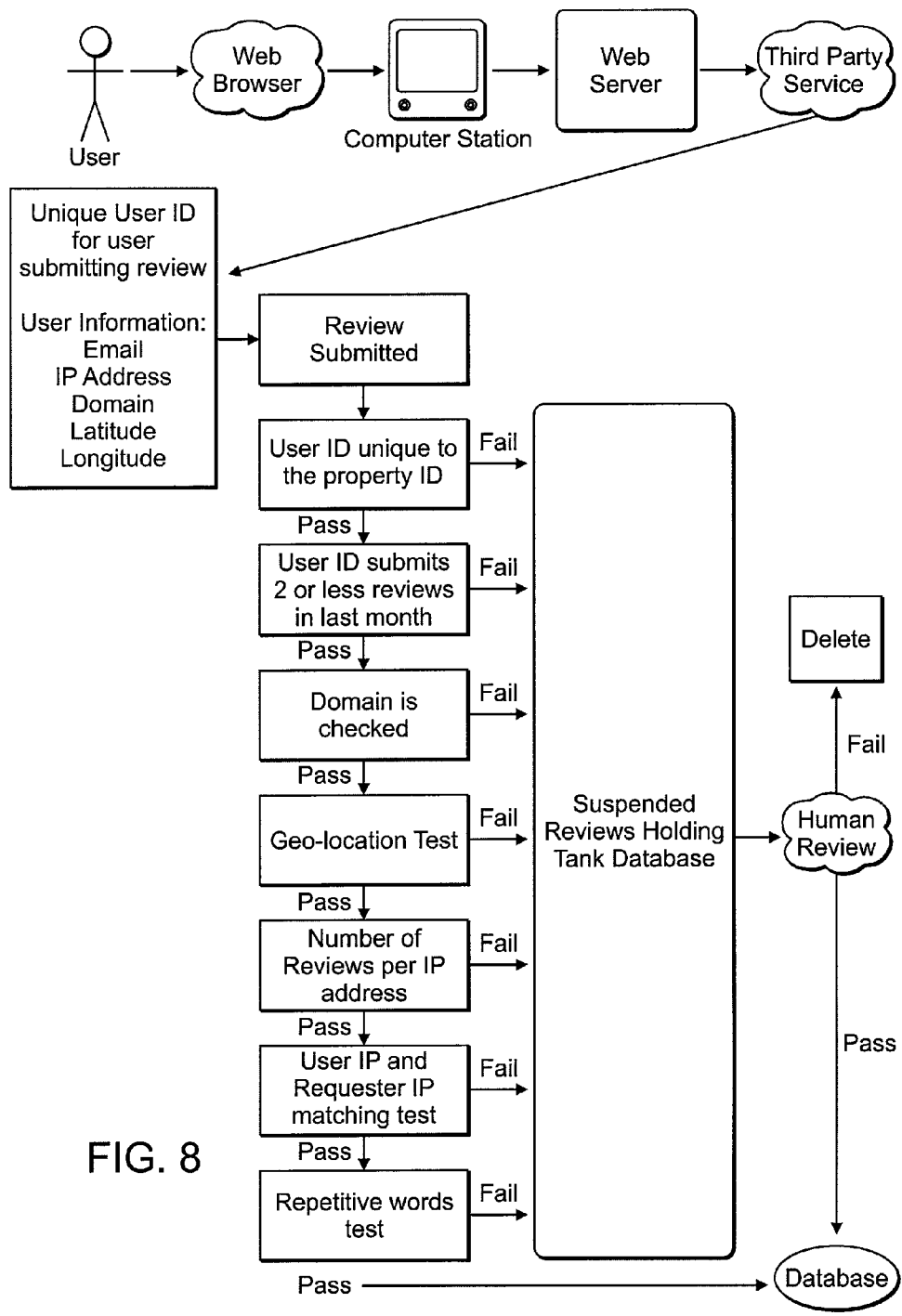
FIG. 8 is a graphical description of the process used to authenticate prior guests and the guest feedback submitted within network third-party web service.

Referring to FIG. 8, a graphical representation of the authentication method and process associated with verifying a guest review when the feedback request is cultivated based on user interaction within the third-party service is illustrated. If an e-mail address is a unique user ID, the first verification step authenticates the review by confirming that each unique user identification is allowed only one review per accommodation. The second verification step authenticates the review by confirming that each unique user identification is allowed two reviews total per month. The third verification step confirms that the unique user providing the review has an email domain that is not the same as the email domain of the Rental Manager or accommodation management service. The fourth step of the review submission authentication process concerns the geo-location of the Rental Manager and the unique user providing the review. The Rental Manager office location is geo-located (latitude and longitude) by reference to the office location included in the third party service database. Reviews are not allowed from uses with an IP address within an X mile radius of the Rental Manager office location, where X may be set to any number. The fifth verification step limits the number of reviews from a given IP address, in the example provided the limit is two, but may be set at an alternative threshold. Further reviews from that IP address are put under suspension. The sixth filter and step in the verification process concerns an IP address check on the Rental Manager requesting reviews and the user submitting reviews, such that a review may not be submitted from the same IP address as the requestor (i.e. the Rental Manager requesting the review). Finally, the seventh step in the verification process authenticates the review by checking the repetition of words and characters in the review submitted, such that a review with X % repetitive words is suspended, where X may be set to any number. Aspects of this authentication method and process in FIG. 8 may be included or excluded depending on the level of verification the service wishes to maintain.

Referring back to FIG. 1, the hardware platform that defines the web server 14 has a central processing unit (CPU) 14a, input/output 14b, and a memory 14c, all of the type conventionally known in the art for use in such platforms (as adapted in accord with the teachings hereof). The software defining the server, e.g., the Apache module (or other server software) and the other modules included or invoked thereby for cultivating and providing feedback on rental accommodations and managing reputation, execute in the conventional manner (as adapted in accord with the teachings hereof) on those elements 14a-14c. Those other modules are depicted in FIGS. 9-11 and are coupled for communication with one another, as well as with other components of system 10, as shown in the drawing and discussed below.

Reservation Email Acquisition Module 30

Figure 9:
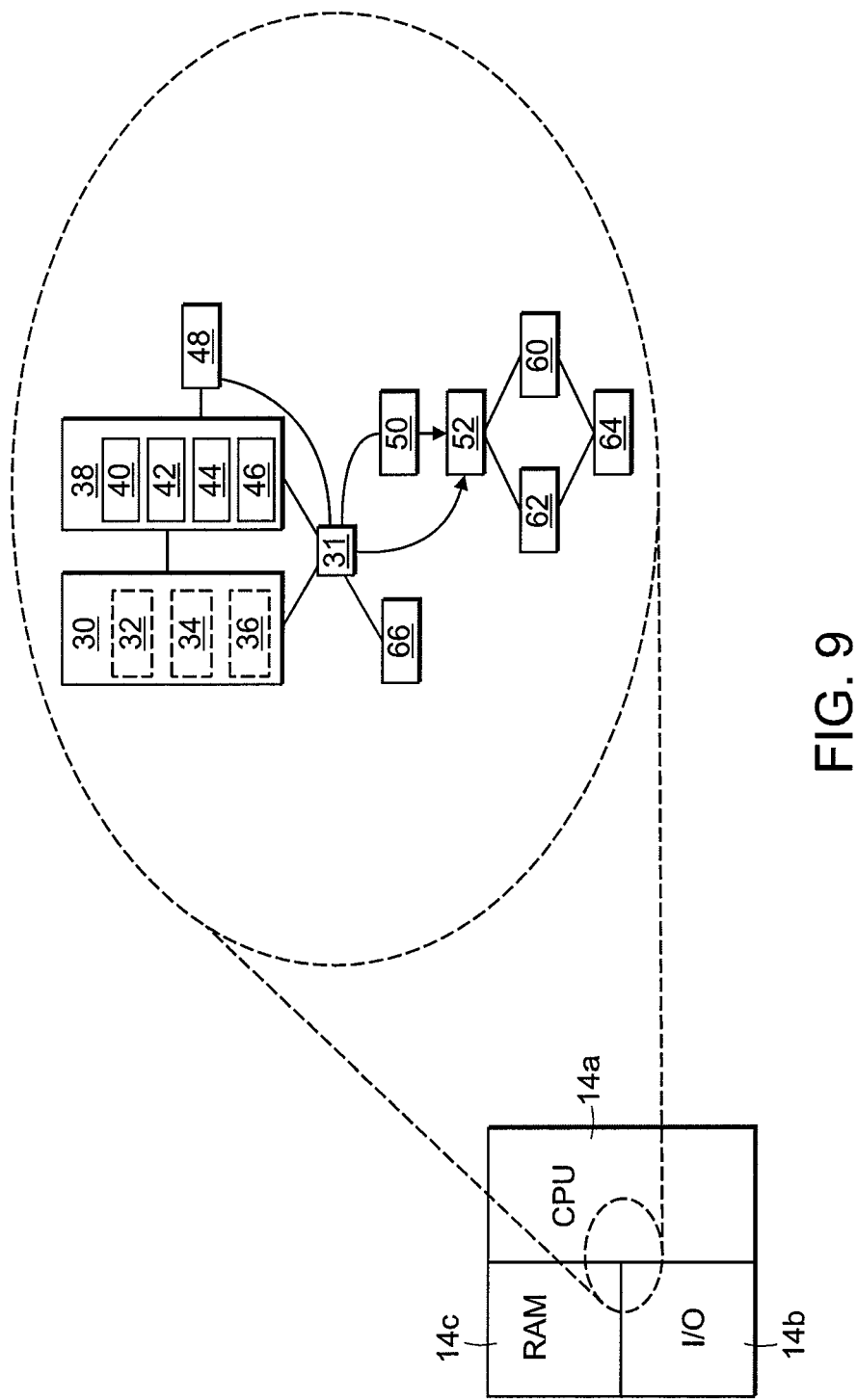
FIGS. 9-11 are graphical descriptions of software modules executed according to one practice of the invention to implement the systems, interfaces and processes depicted in FIGS. 1-8.
Figure 10:
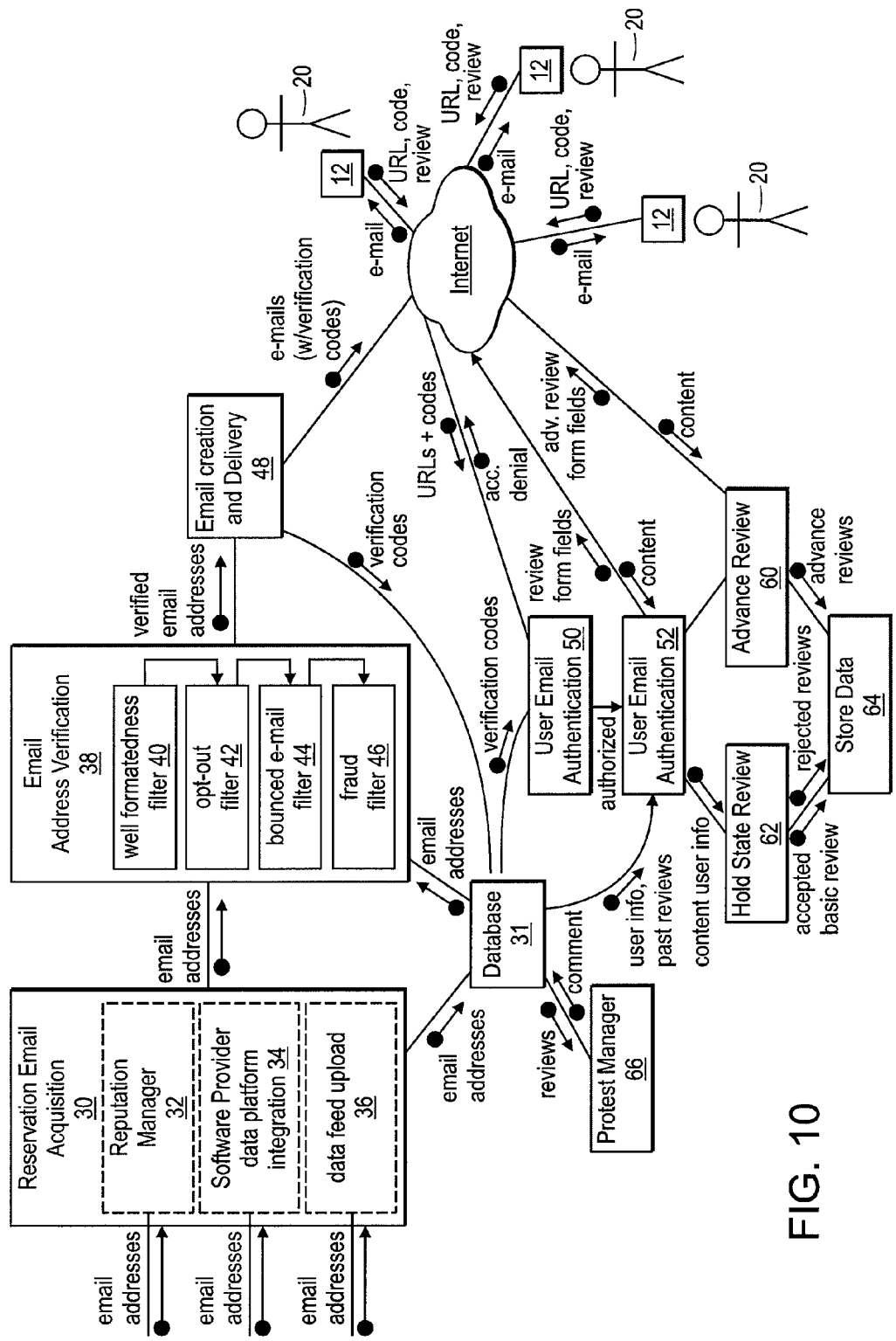
Figure 11:
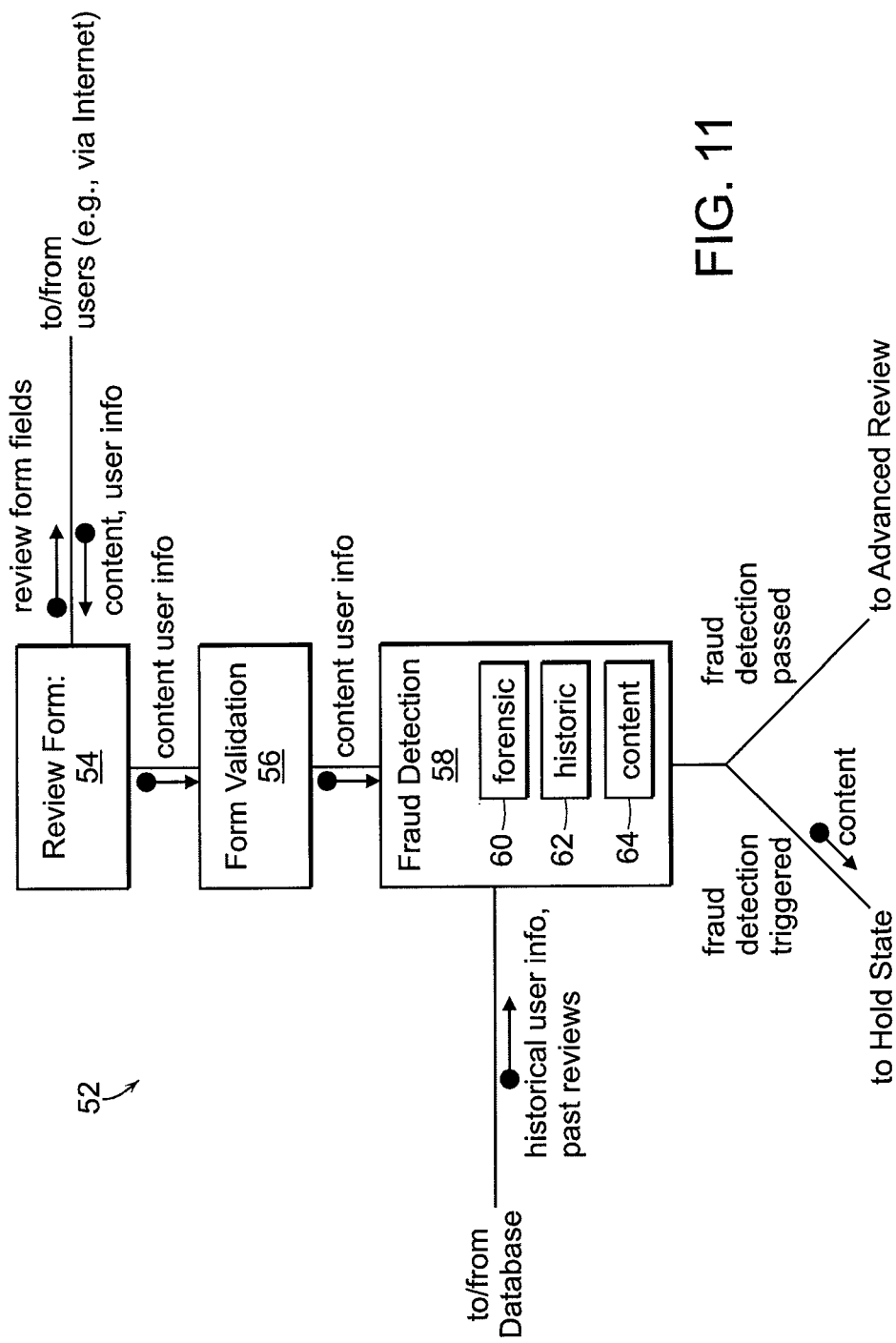

Referring to FIGS. 9 and 10, reservation email acquisition module 30 obtains guest email addresses. The function of the module 30 is to abstract the email address from external sources. The system of the acquisition is comprised of an input mechanism represented, here, by three distinct sub-modules (though, a greater or lesser number of sub-modules may be utilized in other embodiments). The output is email address(es) stored in a relational database system 31 of the type managed by database server 22.

The first sub-module is the Reputation Manager 32. The Reputation Manager sub-module 32 is a Web application which allows managers and/or owners of homes to input email addresses that correspond with their property reservations. After a user with owner permissions has authenticated within a Web environment, they are allowed to access the Reputation Manager. The Reputation Manager 32 displays a listing of all of the manager/owner's unique properties. Next to each property is a data entry input that provides the user with the ability to enter one or many email addresses. The email addresses entered represent owner-verified guest reservations and are be utilized for contacting the guest. Once finished entering, the owner/manager submits the email addresses. The emails are stored with their respective unique property identifiers in a database system, e.g., database 31.

The following is pseudo-code illustrating functionality of the Reputation Manager sub-module 32.

```
If (user.authorize( ) == valid && user.type( ) == manager){
    properties = db.selectAllProperties(user);
    foreach (p in properties){
        p.emails =
validate(input.obtainEmailAddresses(email_array[ ]));
    }
    if (form.submit(properties) = true){
```

-continued

```
        foreach(p in properties) {
            db.storeEmails(p, p.email);
        }
    }
}
```

The second sub-module is a Software Provider data platform integration module 34. Software providers that empower property management reservation systems may provide a private API for access to an authenticated partner. Access to the private API allows such authenticated partners to obtain email addresses based upon firm reservation history for each property in the partner's system.

In the Software Provider system, records are kept of each email address corresponding with every property reservation made through their systems. A Software Provider partner first authenticates with the Software Provider sub-module 34 by providing the Software Provider data feed. The software data feed can contain a number of data elements, not only limited to the booking records (email addresses) but also containing relevant property data, calendar updates, pricing records, and more. The third-party data access requires a customized integration for each Software Provider. The integration can lie over a common protocol and format such as XML/SOAP over HTTP, or alternatively it could be a more customized direct integration such as access to the third-party Software Provider's database over a remote connection. Connection with such Software Providers is performed in accord with the Software Provider's system architecture and can include adaptation of the sub-modules described herein for integration therewith. After successful authentication, the server connects over a network to extract the reservation history of all properties for a given manager/owner. The server then parses out the email addresses from the reservation history data set. The email addresses contained in the reservation history represent owner-verified guest reservations and will be utilized for contacting the guest. The emails are stored with their respective unique property identifiers in the database system 31.

The following is pseudo-code illustrating functionality of the Software Provider data platform integration 34.

```
conn = softwareprovider.authorize( )
if (conn == valid) {
    managers = conn.selectAllManagers( );
    foreach (m in managers) {
        properties = conn.selectAllProperties(m);
        foreach (p in properties) {
            reservations = conn.selectAllReservations(p,
date_begin, date_end);
            email_list = parse_emails(reservations);
            db.storeEmails(p, email_list);
        }
    }
}
```

The data format containing the reservation information via the direct Software Provider integration can come in a variety of formats, including, but not limited, to SOAP, REST, XML, Text File, Database Table, CSV, and other similar alternative data formats.

The third sub-module is a data feed upload module 36 provided directly by the manager/owner. The manager/owner creates a list of email addresses corresponding to property reservations in the format of a spreadsheet, XML, or other similar type of data file.

In this data feed upload sub-module 36, the manager/owner creates a data file containing email addresses and transfers the data file to the server. The transport mechanism to the server can be any network transfer protocol, including, but not limited to FTP, SCP, email, etc. Upon successful transfer of the data file, the server recognizes the existence of the file. The server code opens and inspects the contents of the file. If the contents are successfully interpreted to be in an understood pre-existing format, then the file is valid. If the contents cannot be interpreted, then a new rule set is created for the server parser so it can read the contents of the file. Once an acceptable rule parser exists for the format of the file, then the server reads the content and parses out the pertinent email address and corresponding pre-existing unique property identifiers for the reservations. The email addresses contained in the reservation history from the data feed upload sub-system represent owner-verified guest reservations and will be utilized for contacting the guest. The emails are stored with their respective unique property identifiers in database system 31.

The following is pseudo-code illustrating functionality of the data feed upload module 36.

```
if (manager.transfer(data_file) == success) {
    if (server.isRecognized(data_file) == true) {
        contents = parse(data_file);
        properties = contents.parseProperties( );
        foreach (p in properties){
            reservations = contents.parseReservations(p);
            email_list = parse_emails(reservations);
            db.storeEmails(p, email_list);
        }
    }
    else {
        server.emailDeveloper(data_file);
        // Developer writes new rule set so file format is recognized in future
    }
}
```

Through any of the three sub-systems 32-36, the Reservation Email Acquisition module 30 is able to store email addresses of verified booking reservations to use as output elements for the larger system.

Email Address Verification

The Email Address Verification module 38 validates the email address for format and acceptability.

The function of module 38 is to ensure that the email address is appropriate for the purposes of initiating a review request. The input of the Email Address Verification module 38 is the email address as stored within the database system 31 and passed from the Reservation Email Acquisition module. The address was previously retrieved via authorized booking records as described in detail in the Reservation Email Acquisition module. The outputs of the Email Address Verification module 38 are verified email addresses. To successfully complete the verification stage in the illustrated embodiment an email address must pass four distinct filters—though, in other embodiments (and other modes of operation of the illustrated embodiment) a greater or lesser number of filters may be employed.

The first filter 40 represents a check of well-formattedness. Email addresses preferably adhere to the strict ruleset as defined in RFC 822 (http://www.w3.org/Protocols/rfc822/). The server iterates through the email address and checks for proper format according to the RFC and a valid domain.

The second filter 42 (which, in the illustrated embodiment, is an optional filter) represents a check against an opt-out list. In adherence with CAN-SPAM laws, if a user associated with an email address has previously requested not to be contacted then their desire is preferably respected. The server iterates through the email address list and checks against the system-wide opt-out list as stored in the database 31. The second part of the opt-out filter checks the individual opt-out list of the manager/owner of the reservation at hand. Each manager can maintain their own opt-out list of guests that have opted-out from receiving third party emails.

The third filter 44 represents a check against a bounced email address list. Should an attempt to send an email be made unsuccessfully due to an undeliverable mention from the recipient's ISP, then the system logs that email address as a "bounced" email. Thus, each email that passes through the system is iterated over and checked against the systemwide database bounced table to ensure the email address has not previously failed.

The fourth filter 46 represents a check against email addresses that were previously entered with the same corresponding unique property identifier. Email addresses entered for the same unique property identifier are checked against systemwide lists of previously entered emails for the manager/owner of the property in question and the time of the last review request sent to this email address to prevent attempts to fraudulently collect reviews.

The following pseudo-code represents functionality of the Email Address Verification module 38:

```
emails = db.retrieveReservationEmails( );
foreach (e in emails) {
    if (e.validateFormat(RFC822) == true) {
        if (db.checkAgainstOptOut(e) == false) {
            if (db.checkAgainstGlobalBounce(e) == false) {
                if ((db.checkAgainstPriorPropertyRequests(e, p)
                    == false) {
                    m = db.getManagerReservation(e);
                    if (db.checkAgainstManagerBounce(e, m)
                        == false) {
                        status = success;
                    }
                }
            }
        }
    }
    if (status != success) {
        db.removeInvalidEmail(e);
    }
}
```

Upon completion of execution of the Email Address Verification module 38, the system has a validated email address that came from a verified booking reservation.

Email Creation and Delivery

The Email Creation and Delivery module 48 creates from a template and deliver customized email requests to authorized recipients' email addresses, as provided by the Email Address Verification module 38.

The function of the Email Creation and Delivery module 48 is to take the validated reservation and email address meta-information as inputs and apply them to a customized template for delivery to the guest(s). The output represents a fully built email message that is sent to validated guest reservation email addresses.

The baseline component of the Customized email message is an email content template. The template can represent HTML, rich-text, plain text, or any other acceptable email format MIME type. The template is broken down into two parts; the first being the fixed section of the layout, and the second being the dynamic data that depends upon the booking reservation information. The server queries the database 31 for the reservation information for the email address that needs to be sent. Based on the reservation information, the server selects the relevant unique property identifier and the corresponding property detail information and manager/owner description. This data and information are inserted into the dynamic section of the Email Request Template, along with the URL of a review page and an authorization code that will subsequently be used to verify the recipients permission to access that page. The codes, can be created in the conventional manner of secure, one-time codes, are stored to database 31, as well. Upon completion of the dynamic data insertion, the email has been fully created.

The customized email message is then sent to the SMTP server (not shown) for delivery to the required recipient(s) 20, e.g., via the Internet and their respective computers 12. Delivery can be accomplished via any Mail Transport Agent that adheres to RFC 822.

The following pseudo-code represents functionality of the Email Template creation and delivery module 48:

```
emails = db.retrieveReservationEmails( );
foreach (e in emails) {
   propinfo = getPropertyInfoForReservation(e.resId);
   managerMessage = getManagerMessage(e.resId);
   template = getGenericTemplate( );
   if (template.customize(propinfo, managerMessage) == success) {
      email.sendMessage(template, e);
   }
}
```

Upon completion of the email template customization and message delivery an email resides in the inbox of the intended recipient. Alternatively, a review request can also be sent via traditional postal type mail, or delivered in person.

User Email Authentication Initiation

The User Email Authentication Initiation module 50 provides for authentication of users following receipt of the customized email, as discussed above. To authorize entry into the review system, the Email Authentication Initiation module 50 uses the input of a special authorization code as contained in the email invitation which is verified by the server system 14. Upon successful completion of the authorization, the user is allowed into the review system to leave their basic review for the unique corresponding property.

There are two methods for authorization. The first is the user clicking on the authorization link contained within the invitation email. The second is the user copying and pasting the authorization code and/or url into his/her web browser 18. In either methodology, the server 14 is checking the posted authorization code against the reservation database 31 to verify that the user is authorized to leave a review. If the authorization code is accepted, then the user is allowed to enter into the authenticated system. If the authorization code is rejected, then the user is denied access to the system.

The following pseudo-code represents logic of the User Email Authentication Initiation module 50:

```
if (user.clickEmailLink( ) == true) {
   isAccepted = db.verifyAuthorizationCode(code);
   if (isAccepted == true) {
      setAuthenticationStatus(true);
      return success;
   }
   else {
      setAuthenticationStatus(false);
      return false;
   }
}
```

The successful output of the system is an authorized user from a validated reservation allowed access to the system to leave a review.

Review Form Validation and Fraud Detection Engine 52

The Review Form Validation and Fraud Detection Engine module 52 generates a web page for input of the user review (via respective browser 18) and performs the corresponding form validation based on processing of the review content. The inputs taken in by the engine 52 include, but are not limited to, the form contents, user heuristic information, and the database results from past reviews (e.g., from database 31).

Turning to FIG. 11, module 52 includes review form sub-module 54, the function of which is to collect inputs for a review of a unique property and associate the results with the unique property identifier in the database. The inputs include, but are not limited, to review text, review title, rating, reviewer name, and reviewer location.

Upon successful authentication into the basic form, the user is presented with a series of form fields on the web page. The user will go through and complete each field with the desired information. When the user is finished with the form, they will click the 'submit' button and the server engine will begin the form validation and the fraud detection process.

Form validation sub-module 56 ensures that the user filled out all form fields correctly and appropriately. Each field is checked for existence, length, and in some cases format. If the form was successfully validated, the control is passed onto the fraud detection engine. If the form failed validation, the control is returned to the user to fix the validation errors generated.

The fraud detection engine 58 can be broken down into three types of fraud validation checks—forensic analysis, content analysis, and historical analysis. The fraud detection engine 58 will check the content of the review for each of these types of analyses. The goal of the fraud detection engine is to look for indicators that a review was fraudulent. A fraudulent review can be represented by, but not limited to:

Review left by manager/owner of property
Review left by guest who did not stay in property
Duplicate review
Reviewer has left too many reviews In order to determine the fraudulent status of the review content, the following controls make up the fraud detection engine.

Forensic Control Submodule 60:
 IP Comparison—Reviewer's IP address is checked against the manager/owner's IP address
 IP Duplication—Reviewer's IP address is checked against database of previously used IP addresses
 IP Geolocation—Reviewer's IP address is checked against the geographic location area of the manager/owner of the property and the physical location of the property.
Historic Control Submodule 62:
 Email check—The reviewer's email address is validated against the existing review database for property duplication and frequency.
 Email domain check—The reviewer's email domain is checked against a list of known associated domains for the property manager/owner.
Content Control Submodule 64:
 Heuristic text matching—common phrases are compared to previous reviews for a property and/or management company.
 Duplication—Text is analyzed for duplication of a previous review, whether accidental or intentional.

Disallowed words—Text is compared to a set of disallowed keywords and phrases. Curses, offensive terms, links, http addresses, and other are included.

The Fraud Detection Engine 58 is always evolving, utilizing the knowledge gained from the existing review base to improve its algorithm and effectiveness at denying fraudulent content from the larger system.

If all fraud detection checks are passed, then the basic review is set to an 'accepted' state and the user is passed control to the advanced review module 60. If any of the fraud detection checks are triggered, then the basic review is sent to a review module 62 which is, in essence, a holding tank where a system, or arbitrator can analyze the review to determine whether it should be published on the site or is, indeed, fraudulent. If the review is set to 'hold' status, then the user is not allowed to move on to complete an advanced review.

The following pseudo-code represents functionality of the Review Form Validation and Fraud Detection Engine 52:

```
form_data   = form.getData( );
user_IP     = html.getIP( );
user_email  = db.getReservationRequestEmail( );
if (validate(form_data) == success) {
    if (user_ip == db.getManagerIP(property))
        { return hold;}
    if (db.checkIPHistory(user_ip) == duplicate )
        {return hold;}
    if (geoLocation(user_ip)
        == geoLocation(db.getManagerIP(property)))
        {return hold;}
    if (db.checkEmailHistory(user_email) == duplicate)
        {return hold;}
    if (parseDomain(user_email)
        == parseDomain(db.getManagerEmail(property)))
        {return hold;}
    if (form_data.subject == db.checkSubjectHistory(property))
        {return hold;}
    if (form_data.text == db.checkTextHistory(property))
        {return hold;}
    if (form_data.text == db.checkDissallowedWords( ))
        {return hold;}
    if (heuristic_check(form_data.text,
    db.checkTextHistory(property) == duplicate)
        { return hold;}
    return accepted;
}
else {
    return error;
}
```

With reference back to FIGS. 9 and 10, the output of the system is an action to send the user to either a final confirmed state or the advanced review page, as both are illustrated in the following sections entitled "Basic Review in Hold State" and "Basic Review in Pass State".

Basic Review in Hold State

The hold state review module 62 holds information about a basic review was flagged as 'hold' by the Fraud Detection Engine 58. The input is the action outcome of the section entitled "Review Form Validation and Fraud Detection Engine".

When the Fraud Detection Engine signals a 'hold' on a review, the basic review data is logged as it was entered into the database system alongside the forensic information about the user who left the review. The information is placed into an offline or web-based holding tank for a future review from an arbitrator, either manually or with a system of analysis.

The arbitrator makes the final decision on whether or not to publish the review or formally reject it. The information from the review is pulled from the database and displayed on-screen. Additionally, a set of relevant information including but not limited to other reviews from the same IP, other reviews from the same email, other reviews from the same property, and more are all displayed alongside the review information.

If the representative elects to approve the review, the review is set to active status in the database and it is included in all sitewide metrics, calculations, and displays. If the representative elects to reject the review, then the review is set to 'inactive' status and the review is formally rejected.

The following pseudo-code represents the logic of the hold state review module 62:

```
if (getFraudDetectionStatus(basic_review) == hold){
    printout(db.getReviewInformation( ));
    printout(db.getRelatedReviewInormation( ));
    if (admin.click('approve')){
        db.setReviewStatus(active);
    }
    if (admin.click('reject')){
        db.setReviewStatus(inactive);
    }
}
```

The output of an inactive review in this state is a final end of the review system with failure. The output of a pass state represents a final end of the review system with a status of 'basic' and 'active'.

Advanced Review

This function of Advanced Review module 60 is to presents the user with an advanced review form. The advanced review form includes a much more in-depth list of questions. Alternatively, this list could be dynamic depending upon the needs of the property manager/owner. The input is the action outcome of the section entitled "Review Form Validation and Fraud Detection Engine".

After entering all the required and/or optional fields in the form, the user clicks submit. Upon submission, the form data will go through the form validation engine. The form validation is to ensure that the user completed all form fields correctly and appropriately. Each field is checked for existence, length, and in some cases format. If the form was successfully validated, the control is passed onto the fraud detection engine. If the form failed validation, the control is returned to the user to fix the validation errors generated.

Once the user has successfully completed the form and cleared the validation engine, then the user is finished.

Storing the Data

The system of Storing the Data module 64 represents the function of permanently capturing the data provided by the reviewer. The input taken in this phase is all of the form data from both the basic and advanced review forms. The data is stored in multiple ways throughout the system for three different purposes.

The first purpose is to store all of the data for presentation on the site. Upon successful review submission, the form fields are all stored in the reviews and advanced reviews database tables. This data is used to both display on the site and within the site ranking algorithm.

The second purpose is for tracking metrics information. This data is used for presenting to guests, by managers/owners for tracking data, and within the admin system for tracking overall site metrics. Upon successful review submission, the numeric form fields are calculated into the metrics tables, and the basic review counters are incremented as necessary within the properties database tables.

The third purpose is to store the data back in the forensics engine for future use in checking over the reviews as described in detail in the module entitled "Fraud Detection Engine". Upon successful review submission, all of the data is tracked within the reviews table for future usage in the forensics engine.

The following pseudo-code represents functionality behind storing the data in the system:

```
basic_data      = session.getBasicData( )
advanced_data   = session.getAdvancedData( )
heuristics      = session.getUserInfo( )
db.storeBasicReviewData(basic_data);
db.storeAdvancedReviewData(advanced_data);
metrics = db.calculateMetrics(basic_data, advaced_data);
db.updateMetrics(metrics);
db.updateHeuristicsInformation(heuristics);
```

The output of the storing of the data is a final success message sent to the terminal for completion of the review process.

Protests and Manager Responses

The function of Protests and Manager Responses module 64 is to allow managers to have a final input on all submitted reviews. Once a review has been accepted into the system, it is publicly available and viewable. However, a manager/owner at any point has the ability to protest or respond to a review one time.

To protest a review, the manager/owner authenticates into the system and enters the Review Management section of the Web site. Next to each review, they are given the two options of protesting or responding to a review.

If a manager protests the review, they click on the protest button and enter a bit of information into a short form about why they are protesting. Two actions immediately take place upon a protest. First, the entered information is stored in the database and is now accessible in the admin section. Second, the review is temporarily disabled. A notification is sent to the administrator of the site that a review has been protested. Much like the arbitration process as detailed in the Hold State, an arbitrator can read the protest information and determine whether to accept or reject the protest. If the protest is accepted, the review is removed from the site and is backed out of the metrics, but left in the database for forensics purposes of future analysis. If the review protest is rejected, then the review is re-published to the site exactly as it was prior to the protest.

Together, the modules shown in FIGS. 9-11 execute on web server 14 to provide the systems, interfaces, processes, and the like, shown in FIGS. 1-8, and discussed above (as well as elsewhere herein) in order to facilitate cultivating and providing feedback on rental accommodations and managing reputation in accord with the invention.

Described above are methods and systems meeting the desired objects. It will be appreciated that the embodiments described herein are merely examples of the invention and that other embodiments, incorporating changes thereto, fall within the scope of the invention. Thus, by way of non-limiting example, it will be appreciated that, although the illustrated embodiments are directed to management of rental properties, the illustrated methods and systems can be applied to other applications, as well. And, by way of further non-limiting example, it will be appreciated that the functionality of the modules an sub-modules shown and described in FIGS. 9-11 may be divided in ways other than those shown herein and may be executed on and over a plurality of data processing systems.

What is claimed is:

1. A method for cultivating and providing user feedback on one or more rental accommodations, the method comprising:
   requesting feedback from one or more prior users of one or more rental accommodations;
   receiving the feedback from the one or more prior users of the one or more rental accommodations;
   authenticating that the received feedback is from the requested one or more prior users;
   receiving one or more inquiries for feedback on one or more of the rental accommodations; and
   providing the authenticated feedback in response to the one or more received inquiries.

2. The method as set forth in claim 1 further comprising:
   registering one or more rental manager systems; and
   associating one or more of the rental accommodations with each of the registered rental manager service providers, wherein the requesting feedback further comprises:
   receiving one or more requests for feedback from one or more prior guests of one or more of the rental accommodations by one or more of the registered rental manager service providers;
   verifying the one or more received requests for feedback on one or more of the rental accommodations are from the one or more of the registered rental manager service providers associated with the one or more of the rental accommodations; and
   requesting the feedback from one or more prior users for the one or more verified requests.

3. The method as set forth in claim 2 wherein the receiving the feedback from the one or more prior users of the one or more rental accommodations further comprises:
   determining if the received feedback from the one or more prior users of the one or more rental accommodations is within a first set distance from the one or more of the registered rental manager service provides associated with the one or more rental accommodations; and
   removing the received feedback which is determined to be from the one or more prior users within the first set distance.

4. The method as set forth in claim 1 wherein the authenticating that the received feedback is from the requested one or more prior users further comprises:
   determining if the received feedback from the one or more prior users of the one or more rental accommodations has been received before; and
   removing the received feedback which has been determined to be received before.

5. The method as set forth in claim 1 wherein the authenticating that the received feedback is from the requested one or more prior users further comprises:
   determining if feedback from the one or more prior users has been received more than a first number of times for a first set period of time; and
   removing the received feedback which has been determined to be received more than the first number of times for the first set period of time.

6. The method as set forth in claim 1 wherein the receiving the feedback from the one or more prior users of the one or more rental accommodations further comprises:
   determining if the received feedback is from the one or more prior users of the one or more rental accommodations; and
   removing the received feedback which is not determined to be from the one or more prior users of the one or more rental accommodations.

7. The method as set forth in claim 1 wherein the receiving the feedback from the one or more prior users of the one or more rental accommodations further comprises:
  determining if the received feedback from the one or more prior users of the one or more rental accommodations repeats at least one of characters and words more than a first set percentage; and
  removing the received feedback which is determined to repeats at least one of characters and words more than the first set percentage.

8. A non-transitory computer readable medium having stored thereon instructions for cultivating and providing user feedback on one or more rental accommodations comprising machine executable code which when executed by at least one processor, causes the processor to perform steps comprising:
  requesting feedback from one or more prior users of one or more rental accommodations;
  receiving the feedback from the one or more prior users of the one or more rental accommodations;
  authenticating that the received feedback is from the requested one or more prior users;
  receiving one or more inquiries for feedback on one or more of the rental accommodations; and
  providing the authenticated feedback in response to the one or more received inquiries.

9. The medium as set forth in claim 8 further comprising:
  registering one or more rental manager systems; and
  associating one or more of the rental accommodations with each of the registered rental manager service providers, wherein the requesting feedback further comprises:
  receiving one or more requests for feedback from one or more prior guests of one or more of the rental accommodations by one or more of the registered rental manager service providers;
  verifying the one or more received requests for feedback on one or more of the rental accommodations are from the one or more of the registered rental manager service providers associated with the one or more of the rental accommodations; and
  requesting the feedback from one or more prior users for the one or more verified requests.

10. The medium as set forth in claim 9 wherein the receiving the feedback from the one or more prior users of the one or more rental accommodations further comprises:
  determining if the received feedback from the one or more prior users of the one or more rental accommodations is within a first set distance from the one or more of the registered rental manager service provides associated with the one or more rental accommodations; and
  removing the received feedback which is determined to be from the one or more prior users within the first set distance.

11. The medium as set forth in claim 8 wherein the authenticating that the received feedback is from the requested one or more prior users further comprises:
  determining if the received feedback from the one or more prior users of the one or more rental accommodations has been received before; and
  removing the received feedback which has been determined to be received before.

12. The medium as set forth in claim 8 wherein the authenticating that the received feedback is from the requested one or more prior users further comprises:
  determining if feedback from the one or more prior users has been received more than a first number of times for a first set period of time; and
  removing the received feedback which has been determined to be received more than the first number of times for the first set period of time.

13. The medium as set forth in claim 8 wherein the receiving the feedback from the one or more prior users of the one or more rental accommodations further comprises:
  determining if the received feedback is from the one or more prior users of the one or more rental accommodations; and
  removing the received feedback which is not determined to be from the one or more prior users of the one or more rental accommodations.

14. The medium as set forth in claim 8 wherein the receiving the feedback from the one or more prior users of the one or more rental accommodations further comprises:
  determining if the received feedback from the one or more prior users of the one or more rental accommodations repeats at least one of characters and words more than a first set percentage; and
  removing the received feedback which is determined to repeats at least one of characters and words more than the first set percentage.

15. A system that cultivates and provides user feedback on one or more rental accommodations, the system comprising:
  a feedback processing system that requests feedback from one or more prior users of one or more rental accommodations and receives the feedback from the one or more prior users of the one or more rental accommodations;
  an authentication system that authenticates that the received feedback is from the requested one or more prior users;
  wherein the feedback processing system receives one or more inquiries for feedback on one or more of the rental accommodations and provides the authenticated feedback in response to the one or more received inquiries.

16. The system as set forth in claim 15 further comprising:
  a registration system that registers one or more rental manager systems; and
  an association system that associates one or more of the rental accommodations with each of the registered rental manager service providers, wherein the feedback processing system receives one or more requests for feedback from one or more prior guests of one or more of the rental accommodations by one or more of the registered rental manager service providers, the authentication system verifies the one or more received requests for feedback on one or more of the rental accommodations are from the one or more of the registered rental manager service providers associated with the one or more of the rental accommodations and the feedback processing system requests the feedback from one or more prior users for the one or more verified requests.

17. The system as set forth in claim 16 wherein the authentication system determines if the received feedback from the one or more prior users of the one or more rental accommodations is within a first set distance from the one or more of the registered rental manager service provides associated with the one or more rental accommodations and removes the received feedback which is determined to be from the one or more prior users within the first set distance.

18. The system as set forth in claim 15 wherein the authentication system determines if the received feedback from the one or more prior users of the one or more rental accommodations has been received before and removes the received feedback which has been determined to be received before.

19. The system as set forth in claim 15 wherein the authentication system determines if feedback from the one or more prior users has been received more than a first number of times for a first set period of time and removes the received feedback which has been determined to be received more than the first number of times for the first set period of time.

20. The system as set forth in claim 15 wherein the authentication system determines if the received feedback is from the one or more prior users of the one or more rental accommodations and removes the received feedback which is not determined to be from the one or more prior users of the one or more rental accommodations.

21. The system as set forth in claim 15 wherein the authentication system determines if the received feedback from the one or more prior users of the one or more rental accommodations repeats at least one of characters and words more than a first set percentage and removes the received feedback which is determined to repeats at least one of characters and words more than the first set percentage.

* * * * *